(12) United States Patent
Kao et al.

(10) Patent No.: US 9,773,147 B1
(45) Date of Patent: Sep. 26, 2017

(54) FINGERPRINT ENROLLMENT METHOD AND APPARATUS USING THE SAME

(71) Applicant: Novatek Microelectronics Corp., Hsinchu (TW)

(72) Inventors: Jau-Hong Kao, Hsinchu County (TW); Yu-Chieh Su, Hsinchu (TW); Yi-Jen Wu, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 15/080,599

(22) Filed: Mar. 25, 2016

(51) Int. Cl.
G06K 9/00 (2006.01)
G06K 9/62 (2006.01)
G06T 11/60 (2006.01)

(52) U.S. Cl.
CPC ..... *G06K 9/00013* (2013.01); *G06K 9/00093* (2013.01); *G06K 9/6202* (2013.01); *G06T 11/60* (2013.01)

(58) Field of Classification Search
USPC ........................................................ 382/124
See application file for complete search history.

(56) References Cited

U.S. PATENT DOCUMENTS

| 6,795,569 B1 | 9/2004 | Setlak | |
| 2010/0232659 A1* | 9/2010 | Rahmes | G06K 9/00087 382/125 |
| 2014/0003681 A1 | 1/2014 | Wright et al. | |
| 2015/0161432 A1* | 6/2015 | Yoshida | H04N 19/635 382/125 |
| 2016/0063298 A1* | 3/2016 | Tuneld | G06K 9/00013 348/77 |

(Continued)

FOREIGN PATENT DOCUMENTS

| CN | 103136517 | 6/2013 |
| CN | 104335226 | 2/2015 |

(Continued)

OTHER PUBLICATIONS

Maltoni et al., "On the Operational Quality of Fingerprint Scanners," available at: https://biolab.csr.unibo.it/ResearchPages/Data/FingScannerQuality1.pdf, retrieved on Mar. 25, 2016.

(Continued)

*Primary Examiner* — Jerome Grant, II
(74) *Attorney, Agent, or Firm* — Jianq Chyun IP Office (57) ABSTRACT

A fingerprint enrollment method and a fingerprint enrollment apparatus are provided. A minutiae feature and a pore feature of a first fingerprint image are extracted to obtain a first template. A minutiae feature and a pore feature of a second fingerprint image are extracted to obtain a second template. A minutiae matching score between the minutiae features of the first template and the minutiae features of the second template is calculated. When the minutiae matching score is between the first threshold and a second threshold, stitching, mosaicking or synthesis of the first template and the second template are performed by utilizing a matching relation between the pore features of the first template and the pore features of the second template and utilizing the matching relation between the minutiae feature of the first template and the minutiae feature of the second template.

24 Claims, 7 Drawing Sheets

(56) References Cited

U.S. PATENT DOCUMENTS

| | | | |
|---|---|---|---|
| 2016/0110583 A1* | 4/2016 | Kuo | G06K 9/00093 |
| | | | 382/125 |
| 2016/0132711 A1* | 5/2016 | Setterberg | G06K 9/00926 |
| | | | 382/124 |
| 2016/0253548 A1* | 9/2016 | Dos Remedios | G06K 9/00013 |
| 2016/0321494 A1* | 11/2016 | Shin | G06K 9/00013 |
| 2016/0358010 A1* | 12/2016 | Yang | G06K 9/00093 |
| 2017/0039410 A1* | 2/2017 | Pi | G06K 9/00053 |

FOREIGN PATENT DOCUMENTS

| | | |
|---|---|---|
| WO | 2005008568 | 1/2005 |
| WO | 2014004210 | 1/2014 |

OTHER PUBLICATIONS

Fred L. Bookstein, "Principal warps: thin-plate splines and the decomposition of deformations," IEEE Transactions on Pattern Analysis and Machine Intelligence, Jun. 1989, pp. 567-585.

Besl et al., "A method for registration of 3-D shapes," IEEE Transactions on Pattern Analysis and Machine Intelligence, Feb. 1992, pp. 239-256.

* cited by examiner

FINGERPRINT ENROLLMENT METHOD AND APPARATUS USING THE SAME

BACKGROUND OF THE INVENTION

1. Field of the Invention

The invention relates to a fingerprint recognition technology, and more particularly, to a fingerprint enrollment method and a fingerprint enrollment apparatus.

2. Description of Related Art

Fingerprint recognition is an important part in Biometric Recognition System. Features of the fingerprint can be classified into three levels including level 1, level 2 and level 3. Level 1 refers to overall geometrical forms (overall shapes of line) of the fingerprint which are macroscopically recognized, such as left loop, right loop, double loop and so on. Level 2 refers to features of lines on the fingerprint which are microscopically recognized, such as ending, bifurcation, eye, hook and so on. The features of line are collectively known as minutiae. Level 3 refers to in-depth features of lines on the fingerprint which are microscopically recognized even further, such as pores and so on.

A fingerprint sensor may be disposed in a small electronic apparatus (e.g., a hand-held cellular phone) for information security. In stage of a fingerprint enrollment, the conventional electronic apparatus performs the fingerprint enrollment according one single capture of a fingerprint image captured by the fingerprint sensor in order to obtain an enrolled fingerprint template. After the finger enrollment is completed, the conventional electronic apparatus can then provide functions for a fingerprint verification. The so-called "fingerprint verification" refers to a comparison of a level of similarity between an enrolled fingerprint and a to-be-tested feature so that whether the same fingerprint is captured can be determined. The functions for the fingerprint verification are applicable to border control, civil identification of offender status, business and home access control, public safety, data access, mobile communications, mobile payment or other information security applications.

The fingerprint sensor may be disposed in the small electronic apparatus (e.g., the hand-held cellular phone). However, due to the restrictions in volume/area of the small electronic apparatus, the fingerprint sensor of the small electronic apparatus is generally a small area sensor. A sensing area of the small area sensor may be smaller than an area of the finger. Because the fingerprint image captured by the small area sensor is only a partial fingerprint of the finger, an area of the enrolled fingerprint template can be fairly small (i.e., the template has a small quantity of feature points). The fingerprint verification may fail frequently if the area of the enrolled fingerprint template is fairly small (i.e., which leads to the small quantity of feature points in a finger template). The user may need to accurately press on a pressed region originally set in the enrollment in order to pass the fingerprint verification. Furthermore, the safety is lowered since the fingerprint template has only the small quantity of feature points.

SUMMARY OF THE INVENTION

The invention is directed to a fingerprint enrollment method and a fingerprint enrollment apparatus, which are capable of automatically stitching multiple fingerprint images to enlarge the area of the template during the enrollment, so as to increase the quantity of feature points of the template.

A fingerprint enrollment method is provided according to the embodiments of the invention. The fingerprint enrollment method includes: capturing a first fingerprint image and a second fingerprint image by a fingerprint sensor; extracting a minutiae feature and a pore feature of the first fingerprint image to obtain a first template; extracting a minutiae feature and a pore feature of the second fingerprint image to obtain a second template; and calculating a minutiae matching score between the minutiae feature of the first template and the minutiae feature of the second template. When the minutiae matching score is greater than a first threshold, the first template and the second template are stitched by utilizing a matching relation between the minutiae feature of the first template and the minutiae feature of the second template. When the minutiae matching score is between the first threshold and a second threshold, the first template and the second template are stitched by utilizing a matching relation between the pore features of the first template and the pore features of the second template and utilizing the matching relation between the minutiae feature of the first template and the minutiae feature of the second template. Herein, the second threshold is less than the first threshold.

A fingerprint enrollment apparatus is provided according to the embodiments of the invention. The fingerprint enrollment apparatus includes a fingerprint sensor, a feature extracting circuit and a feature stitching circuit. The fingerprint sensor is configured to capture a first fingerprint image and a second fingerprint image. The feature extracting circuit is coupled to the fingerprint sensor to receive the first fingerprint image and the second fingerprint image. The feature extraction circuit extracts a minutiae feature and a pore feature of the first fingerprint image to obtain a first template. The feature extraction circuit extracts a minutiae feature and a pore feature of the second fingerprint image to obtain a second template. The feature stitching circuit is coupled to the feature extracting circuit to receive the first template and the second template. The feature stitching circuit calculates a minutiae matching score between the minutiae feature of the first template and the minutiae feature of the second template. When the minutiae matching score is greater than a first threshold, the feature stitching circuit stitches the first template and the second template by utilizing a matching relation between the minutiae feature of the first template and the minutiae feature of the second template. When the minutiae matching score is between the first threshold and a second threshold, the feature stitching circuit stitches the first template and the second template by utilizing a matching relation between the pore features of the first template and the pore features of the second template and utilizing the matching relation between the minutiae feature of the first template and the minutiae feature of the second template. Herein, the second threshold is less than the first threshold.

Based on the above, the fingerprint enrollment method and the fingerprint enrollment apparatus as described in the embodiments of the invention are capable of capturing multiple fingerprint images for the fingerprint enrollment from the same finger by the fingerprint sensor. During the enrollment, the feature stitching circuit of the fingerprint enrollment apparatus can automatically perform the stitching, mosaicking or synthesis of multiple templates corresponding to multiple fingerprint images, so as to enlarge the area of the template to thereby increase the quantity of feature points of the enrolled templates.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

The term "coupled (or connected)" used in this specification (including claims) may refer to any direct or indirect connection means. For example, "a first apparatus is coupled (connected) to a second apparatus" should be interpreted as "the first apparatus is directly connected to the second apparatus" or "the first apparatus is indirectly connected to the second apparatus through other apparatuses or connection means". Moreover, wherever appropriate in the drawings and embodiments, elements/components/steps with the same reference numerals represent the same or similar parts. Elements/components/steps with the same reference numerals or names in different embodiments may be cross-referenced.

Figure 1:
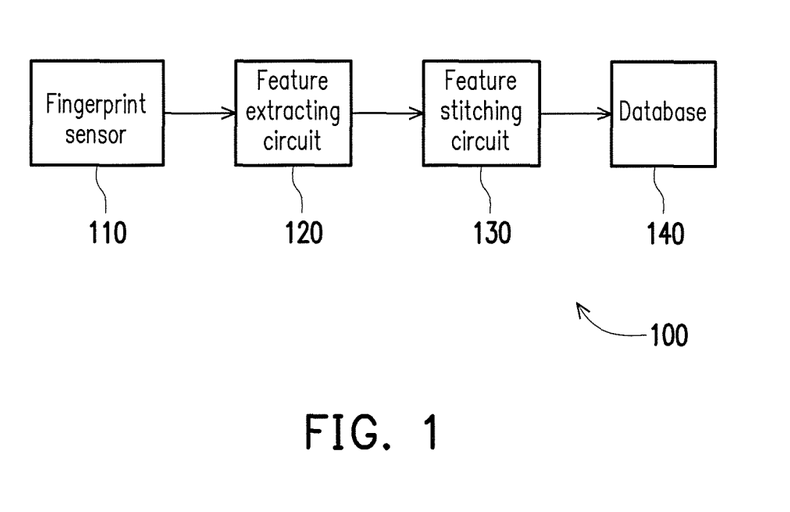
FIG. 1 is a block diagram illustrating circuitry of a fingerprint enrollment apparatus according to an embodiment of the invention.

FIG. 1 is a block diagram illustrating circuitry of a fingerprint enrollment apparatus 100 according to an embodiment of the invention. The fingerprint enrollment apparatus 100 includes a fingerprint sensor 110, a feature extracting circuit 120, a feature stitching circuit 130 and a database 140. The database 140 may be a volatile storage medium or a non-volatile storage medium. For instance, the database 140 may be magnetic tapes, semiconductor memories, magnetic disks, compact disks (e.g., CD-RAM or DVD-RAM) or other storage mediums. The semiconductor memories may include dynamic random access memory (DRAM), static random access memory (SRAM), electrically erasable programmable read only memory (EEPROM), FLASH memory or other types of memory.

Figure 2:
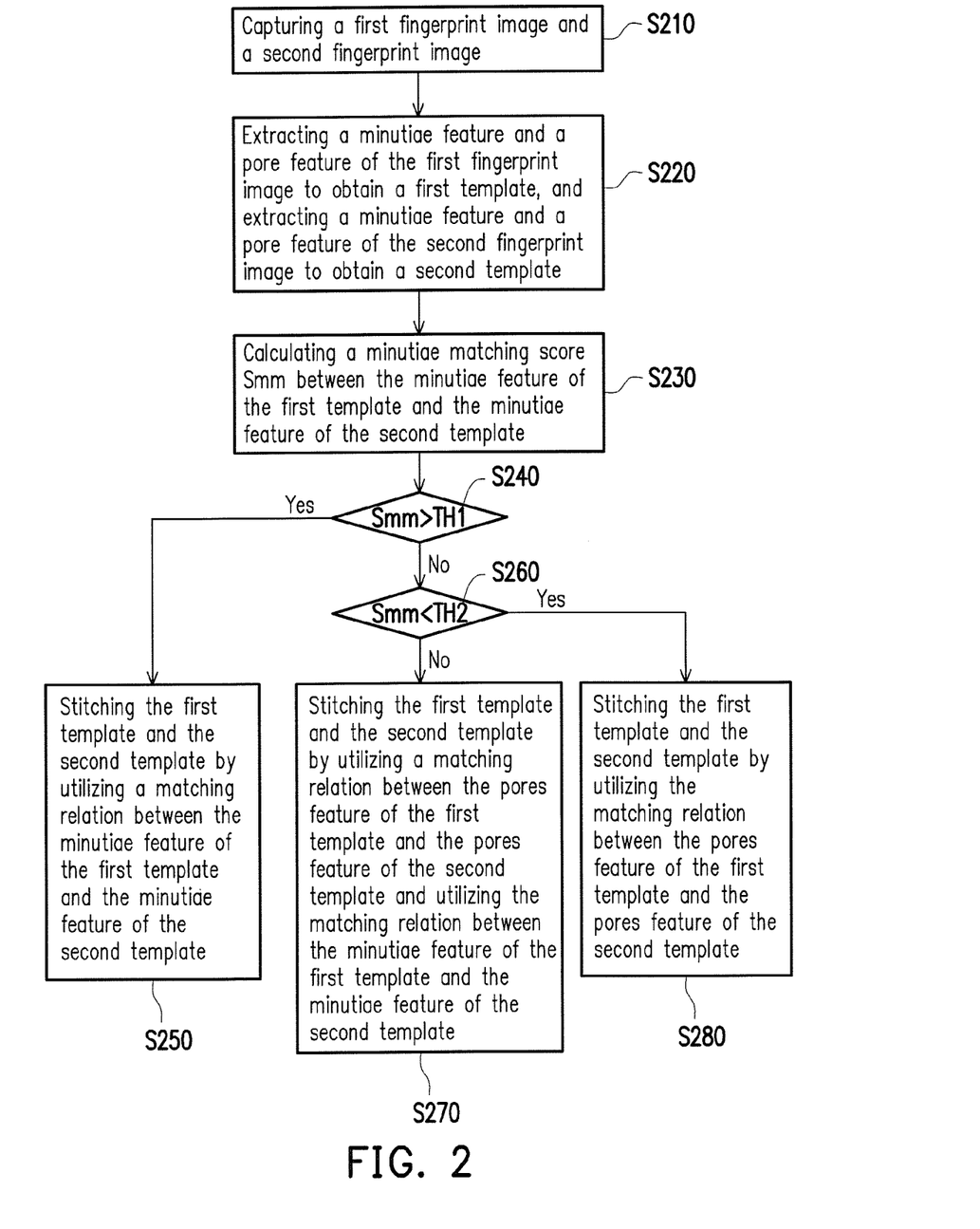
FIG. 2 is a flowchart illustrating a fingerprint enrollment method according to an embodiment of the invention.

FIG. 2 is a flowchart illustrating a fingerprint enrollment method according to an embodiment of the invention. The so-called "fingerprint enrollment" includes operations of collecting a fingerprint image through a collecting apparatus (e.g., the fingerprint sensor 110), enhancing the fingerprint image to obtain favorable line information, analyzing a line characteristic in the fingerprint image, marking features on the lines, and recording said features down. When the user places the finger on the fingerprint sensor 110, the fingerprint sensor 110 can capture a first fingerprint image of the finger in step S210. When the user moves the finger away from the fingerprint sensor 110 and then places the finger on the fingerprint sensor 110 again, the fingerprint sensor 110 can further capture a second fingerprint image of the finger in step S210. Based on the user's operations on the finger, the first fingerprint image may be different from the second fingerprint image. Based on design requirements, the fingerprint sensor 110 may be an optical sensor, a capacitive sensor or other types of sensor. Herein, description is provided by using two fingerprint images for example, but the present embodiment is not limited thereto. For instance, the fingerprint sensor 110 can capture three or more fingerprint images at different time points in step S210. According to the following description related to the feature extracting circuit 120 and the feature stitching circuit 130, the process for three or more fingerprint images may be deduced by person with ordinary skill in the art with reference to the process for two fingerprint images.

The feature extracting circuit 120 is coupled to the fingerprint sensor 110 to receive the first fingerprint image and the second fingerprint image. The feature extracting circuit 120 can extract a minutiae feature and a pore feature of the first fingerprint image to obtain a first template in step S220. The feature extracting circuit 120 can further extract a minutiae feature and a pore feature of the second fingerprint image to obtain a second template in step S220. A method (algorithm) for extracting the minutiae feature and the pore feature from the fingerprint image is not particularly limited in the present embodiment. For instance, in some embodiments, the feature extracting circuit 120 can extract the minutiae feature and the pore feature from the fingerprint image by using conventional image processing/recognition technology in step S220.

Figure 3:
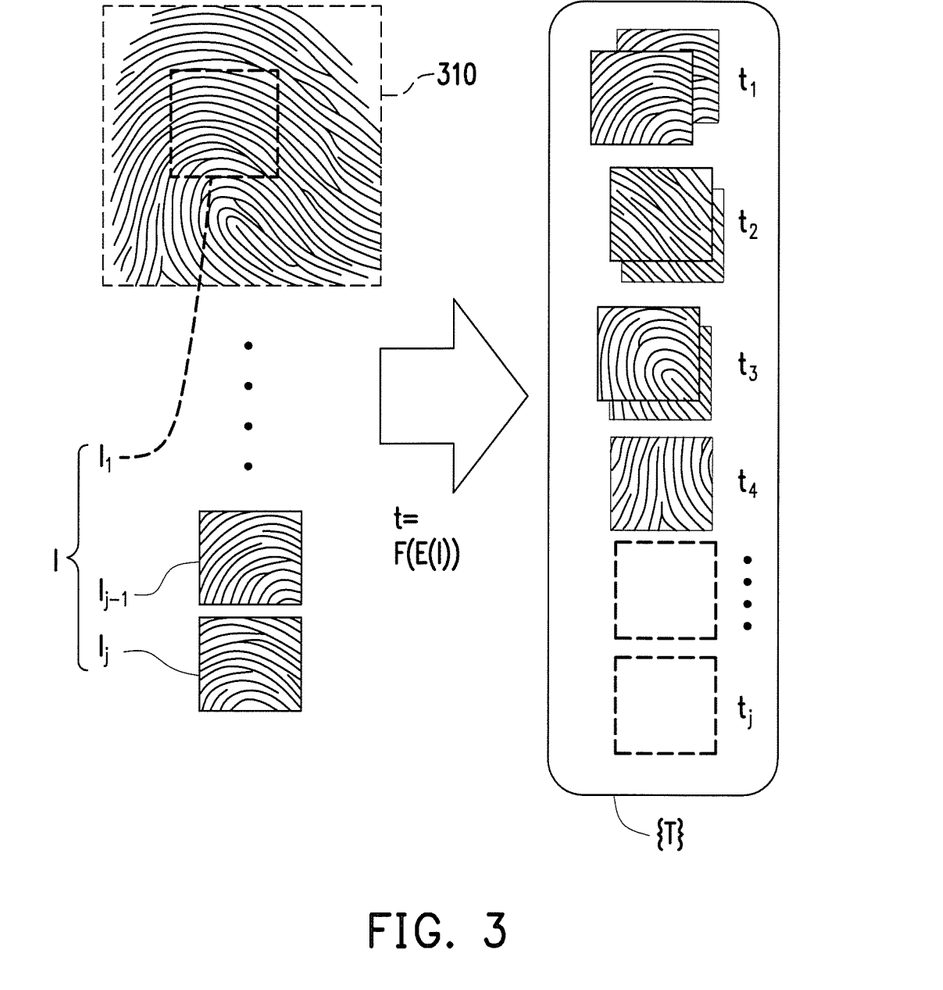
FIG. 3 is a schematic diagram illustrating examples of capturing the fingerprint image and extracting the features according to an embodiment of the invention.

FIG. 3 is a schematic diagram illustrating examples of capturing the fingerprint image and extracting the features according to an embodiment of the invention. Referring to FIG. 1, FIG. 2 and FIG. 3, when the user places a finger 310 on the fingerprint sensor 110 repeatedly, the fingerprint sensor 110 can capture a plurality of fingerprint images $I_1, \ldots, I_{j-1}, I_j$ of the finger 310 in step S210. Hereinafter, the fingerprint images $I_1$ to $I_j$ are referred to as a fingerprint image set I. The feature extracting circuit 120 can execute an algorithm $\{T\}=F(E(I))$ to extract the minutiae features and the pore features from the different fingerprint images $I_1$ to $I_j$ in the fingerprint image set I to obtain a plurality of templates $t_1, t_2, t_3, t_1$ in step S220. Hereinafter, the templates $t_1$ to $t_1$ are referred to as a template set $\{T\}$. For instance, the feature extracting circuit 120 can execute the algorithm $t_1=F(E(I_1))$ to extract the minutiae feature and the pore feature of the fingerprint image $I_1$ to obtain the template $t_1$. Herein, $E(I_1)$ represents a preprocessing performed by the feature extracting circuit 120 for the fingerprint image $I_1$, such as an image enhancement and/or other image processing algorithms (e.g., the conventional image processing algorithms). $F(E(I_1))$ represents a feature extraction performed by the feature extracting circuit 120 for the preprocessed fingerprint image $E(I_1)$, such as the conventional feature extraction algorithm.

Referring to FIG. 1 and FIG. 2, the feature stitching circuit 130 is coupled to the feature extracting circuit 120 to receive the first template and the second template. The feature stitching circuit 130 can calculate a minutiae matching score Smm between the minutiae feature of the first template and the minutiae feature of the second template in step S230. A method (algorithm) for calculating the minutiae matching score Smm is not particularly limited in the present embodiment. For instance, in some embodiments, a minimal edit distance between the minutiae feature of the first template and the minutiae feature of the second template may be found by utilizing a dynamic-programming algorithm, and then the minutiae matching score Smm may be calculated according to the quantity of matching fingerprint features between the two templates in step S230. In other embodiments, the feature extracting circuit 120 can calculate the minutiae matching score Smm by using conventional algorithms in step S220. Generally, the minutiae matching score Smm is higher if the quantity of matchable minutiae features between the two templates is higher.

Figure 4:
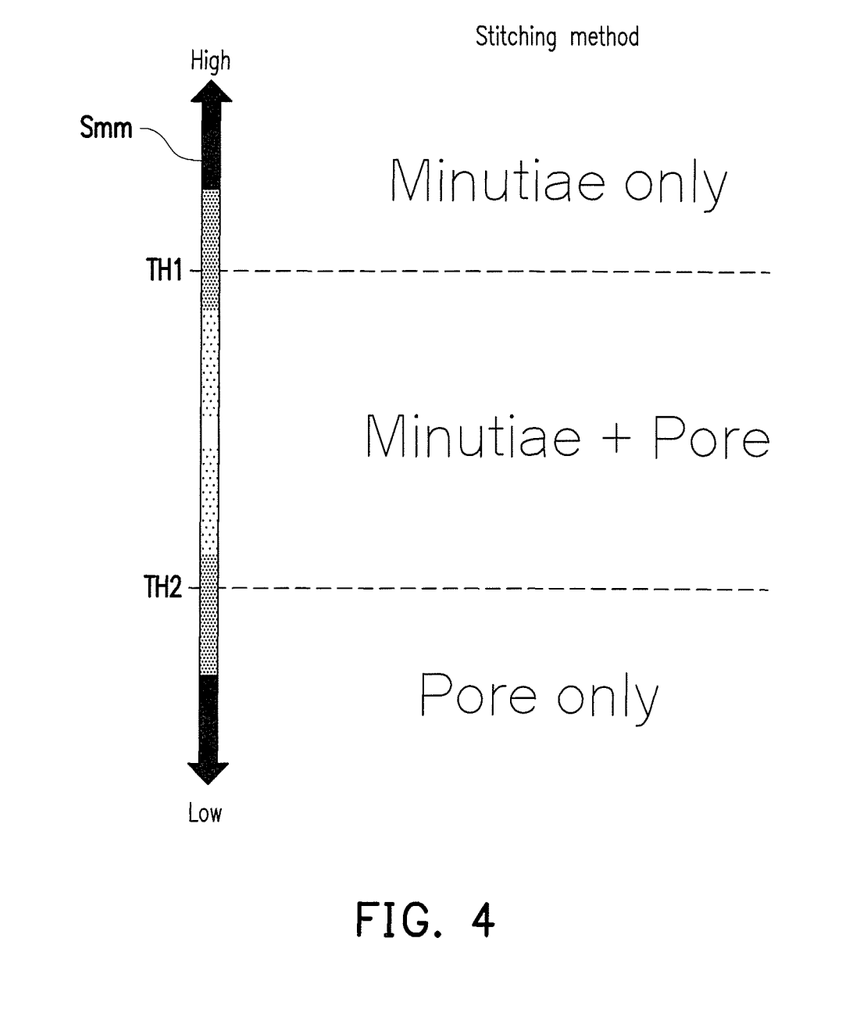
FIG. 4 is a schematic diagram illustrating the relation between the minutiae matching score and a stitching method according to an embodiment of the invention.

FIG. 4 is a schematic diagram illustrating the relation between the minutiae matching score Smm and a stitching method according to an embodiment of the invention. Referring to FIG. 1, FIG. 2 and FIG. 4, whether the minutiae matching score Smm is greater than a first threshold TH1 is compared in step S240. The first threshold TH1 may be set according to design requirements. When the minutiae matching score Smm is greater than the first threshold TH1, the feature stitching circuit 130 executes step S250. In step S250, the feature stitching circuit 130 performs stitching, mosaicking or synthesis of the first template and the second template by utilizing a matching relation between the minutiae feature of the first template and the minutiae feature of the second template. As compared to the pore features (level 3 features), the minutiae feature (level 2 features) are not prone to influence from noises. In the case where the quantity of matchable minutiae features is sufficient, the feature stitching circuit 130 can stitch the two templates by utilizing only the matching relation between the minutiae features.

When determining that the minutiae matching score Smm is less than the first threshold TH1 in step S240, the feature stitching circuit 130 executes step S260. In step S260, whether the minutiae matching score Smm is less than a second threshold TH2 is compared. The second threshold TH2 may be set according to design requirements, wherein the second threshold TH2 is less than the first threshold TH1. When the minutiae matching score Smm is greater than the second threshold TH2, the feature stitching circuit 130 executes step S270. When the minutiae matching score Smm is less than the second threshold TH2, the feature stitching circuit 130 executes step S280.

When the minutiae matching score Smm is between the first threshold TH1 and the second threshold TH2, the feature stitching circuit 130 executes step S270. In step S270, the feature stitching circuit 130 performs stitching, mosaicking or synthesis of the first template and the second template by utilizing a matching relation between the pore feature of the first template and the pore feature of the second template and utilizing the matching relation between the minutiae feature of the first template and the minutiae feature of the second template. It is possible that the fingerprint sensor 110 of the small area type is unable to obtain sufficient number of minutiae features (level 2 features). However, for real fingers the quantity of the pore features (level 3 features) is generally much more than that of minutiae features (level 2 features). It draws the idea that information of the pore features (level 3 features) may be used to facilitate improvement in correctness for stitching the templates when the quantity of the minutiae features (level 2 features) is insufficient. Hence, when the minutiae matching score Smm falls between the first threshold TH1 and the second threshold TH2, the feature stitching circuit 130 can utilize the matching relation between the minutiae features plus the matching relation between the pore features to stitch the two templates.

When the minutiae matching score Smm is less than the second threshold TH2, the feature stitching circuit 130 executes step S280. In step S280, the feature stitching circuit 130 performs stitching, mosaicking or synthesis of the first template and the second template by utilizing the matching relation between the pore features of the first template and the pore features of the second template. For real fingers the quantity of the pore features (level 3 features) is generally much more than that of minutiae features (level 2 features). When the quantity of the minutiae features (level 2 features) is in severe shortage, the feature stitching circuit 130 can stitch the two templates by utilizing only the matching relation between the pore features (level 3 features).

In some embodiments, the feature stitching circuit 130 can select at least one matching pore feature from a plurality of pore features of the first template and select at least one matching pore feature from a plurality of pore features of the second template according to the matching relation between the pore feature of the first template and the pore feature of the second template in step 280. The feature stitching circuit 130 can stitch the first template into the second template by transforming the first template from a coordinate space of the first template into a coordinate space of the second template according to the matching pore feature of the first template and the matching pore feature of the second template in step S280. After stitching the first template into the second template, the feature stitching circuit 130 can delete the first template from the template set {T} in step S280. A method (algorithm) for transforming the coordinate space adopted in step S280 is not particularly limited by the present embodiment. For instance, in some embodiments, a "rigid body deformation of the fingerprint" algorithm may be adopted in step S280 (e.g., a coordinate space transformation is performed by a least square method between feature points). In some other embodiments, an "elastic deformation of the fingerprint" algorithm may be adopted in step S280. Because the skin is the non-rigid body, an elastic deformation may occur each time when the finger is pressed on things. The elastic deformation of the fingerprint may be described and calculated by using a non-rigid body coordinate transformation. For example, in step S280, the first template may be transformed from the coordinate space of the first template into the coordinate space of the second template by using a Thin Plate Spline (TPS) function or an Iterative Closest Point (ICP) function. The TPS function and the ICP function belong to conventional art, and thus description regarding the same is omitted herein. The feature stitching circuit 130 can take in consideration of position deviation of the features generated by the fingerprint deformation to reduce error accumulation and increase recognition correct rate.

Based on the above, the fingerprint enrollment method and the fingerprint enrollment apparatus 100 described in the embodiments of the invention are capable of performing the fingerprint enrollment by capturing multiple fingerprint images from the same finger by the fingerprint sensor 110. During the enrollment, the feature stitching circuit 130 of the fingerprint enrollment apparatus 100 can select any two templates from the multiple templates $t_1$ to $t_j$ of the template set $\{T\}$, and execute step S250, step S270 and step S280 to attempt the stitching of the selected two templates. Once the stitching is completed successfully, the selected two templates are synthesized into one template with larger area (this process is known as "Fingerprint Template Synthesis"). The repeatedly collected templates may be combined to enlarge the area of the template, so as to increase the amount of information (quantity of feature points). Therefore, the fingerprint enrollment apparatus 100 can increase the feature coverage by the feature stitching.

The stitching operation has ended when the feature stitching circuit 130 can no longer find two stitch-able templates from the multiple templates $t_1$ to $t_j$ of the template set $\{T\}$. After the stitching operation is ended, the template set $\{T\}$ may contain a plurality of templates. The feature stitching circuit 130 can store the template set $\{T\}$ consisting of multiple templates to the database 140 (this process is known as "Multi-Template Fingerprint enrolling"). In some embodiments, before storing the template set $\{T\}$ to the database 140, the feature stitching circuit 130 can further check the quantity of feature points for the multiple templates of the template set $\{T\}$. If the quantity of feature points in one specific template among the templates of the template set $\{T\}$ is less than one specific threshold, the feature stitching circuit 130 can remove that specific template from the template set $\{T\}$ to improve information integrity of the system. The specific threshold may be determined according to design requirements.

Figure 5:
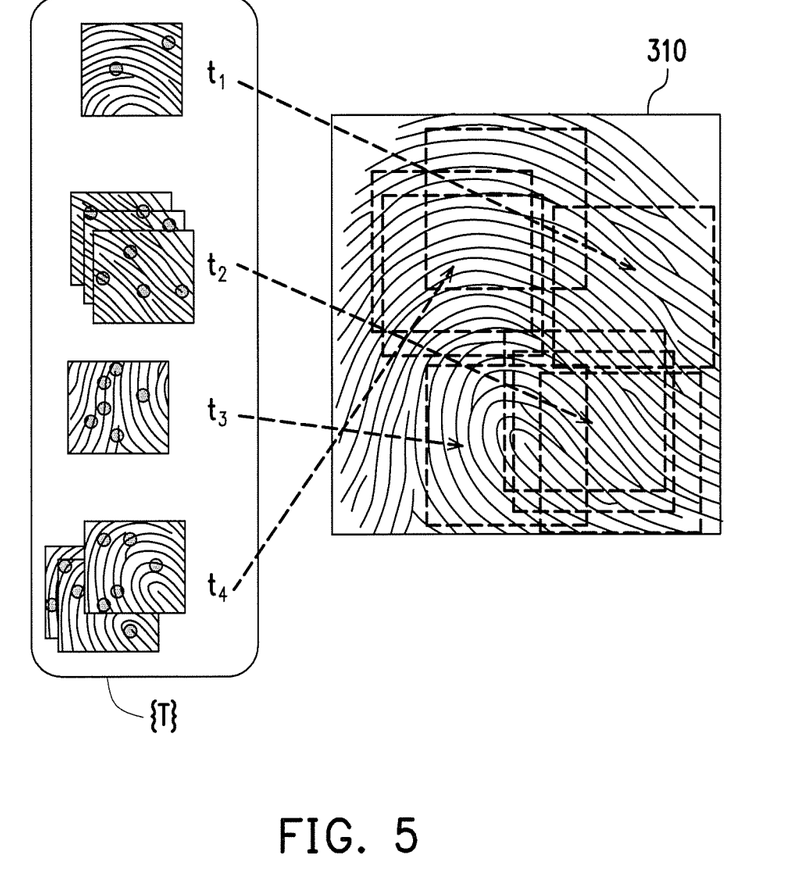
FIG. 5 is a schematic diagram illustrating a scenario of the feature coverage of the template set according to an embodiment of the invention.

FIG. 5 is a schematic diagram illustrating a scenario of the feature coverage of the template set $\{T\}$ according to an embodiment of the invention. The template set $\{T\}$ shown in FIG. 5 includes the stitched templates $t_1$, $t_2$, $t_3$ and $t_4$. Each of the templates $t_1$ to $t_4$ is synthesized into the template with larger area through aforesaid stitching operation. For instance, the template $t_4$ shown in FIG. 5 is formed by stitching three unit templates together. As shown in FIG. 5, each of the templates $t_1$ to $t_4$ of the template set $\{T\}$ covers a different area of the finger 310 to increase an amount of fingerprint information (the quantity of feature point). Therefore, the fingerprint enrollment apparatus 100 can improve a success rate of the fingerprint verification in the case where the small area sensor is adopted.

Figure 6:
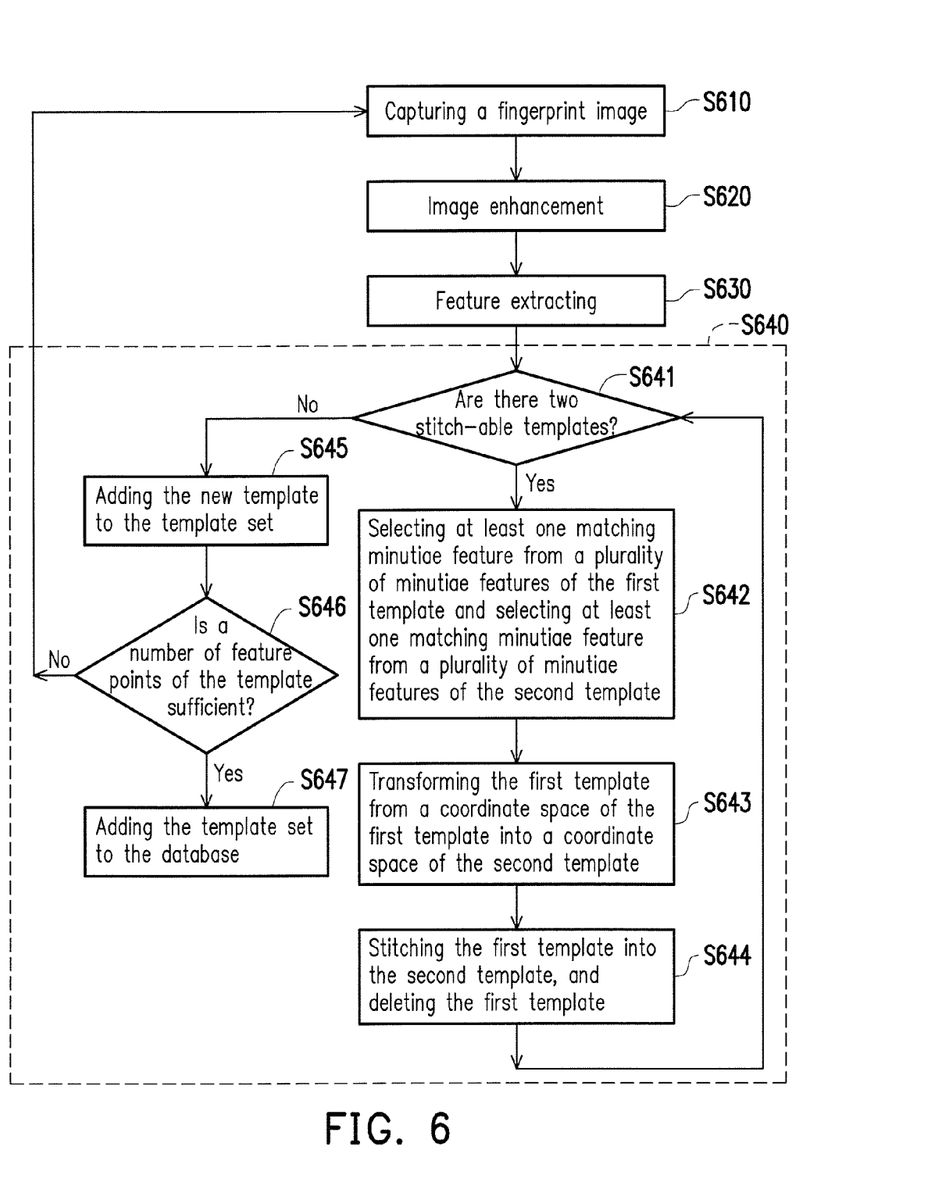
FIG. 6 is a flowchart illustrating a fingerprint enrollment method according to another embodiment of the invention.

FIG. 6 is a flowchart illustrating a fingerprint enrollment method according to another embodiment of the invention. When the user places the finger 310 on the fingerprint sensor 110, the fingerprint sensor 110 can capture a fingerprint image of the finger in step S610. Step S610 shown in FIG. 6 may be deduced with reference to related description of step S210 shown in FIG. 2, which is not repeated hereinafter. The feature extracting circuit 120 can perform a preprocessing for the fingerprint image in step S620. A method (algorithm) for performing the preprocessing is not particularly limited in the present embodiment. For instance, in some embodiments, the feature extracting circuit 120 can perform the preprocessing for the fingerprint image by using an image enhancement and/or other image processing algorithms (e.g., the conventional image processing algorithms) in step S620. The feature extracting circuit 120 can extract a minutiae feature of the preprocessed fingerprint image to obtain a template in step S630. A method (algorithm) for extracting the minutiae feature from the fingerprint image is not particularly limited in the present embodiment. For instance, in some embodiments, the feature extracting circuit 120 can extract the minutiae feature from the fingerprint image by using conventional image processing/recognition technology in step S630. Step S620 and step S630 shown in FIG. 6 may be deduced with reference to related description for step S220 shown in FIG. 2, which is not repeated hereinafter. The feature stitching circuit 130 performs stitching, mosaicking or synthesis of the first template and the second template by utilizing a matching relation between the minutiae feature of the first template and the minutiae feature of the second template in step S640. Step S640 shown in FIG. 6 may be deduced with reference to related description for step S250 shown in FIG. 2, and/or step S250 shown in FIG. 2 may be deduced with reference to related description for step S640 shown in FIG. 6.

In the embodiment shown in FIG. 6, step S640 includes sub-steps S641 to S647. In step S641, whether the template set $\{T\}$ includes the first template and the second template which are stitch-able is determined. When the template set $\{T\}$ includes the first template and the second template which are stitch-able, the feature stitching circuit 130 executes step S642. In step S642, the feature stitching circuit 130 selects at least one matching minutiae feature from a plurality of minutiae features of the first template and selects at least one matching minutiae feature from a plurality of minutiae features of the second template according to the matching relation between the minutiae feature of the first template and the minutiae feature of the second template.

In step S643, the feature stitching circuit 130 can transform the first template from a coordinate space of the first template into a coordinate space of the second template according to the matching minutiae feature of the first template and the matching minutiae feature of the second template. A method (algorithm) for transforming the coordinate space adopted in step S643 is not particularly limited by the present embodiment. For instance, in some embodiments, a "rigid body deformation of the fingerprint" algorithm may be adopted in step S643 (e.g., a coordinate space transformation is performed by a method of least square between feature points). In some other embodiments, an "elastic deformation of the fingerprint" algorithm may be adopted in step S643. Because the skin is the non-rigid body, an elastic deformation may occur each time when the finger is pressed on things. The elastic deformation of the fingerprint may be described and calculated by using a non-rigid body coordinate transformation. For example, in step S643, the first template may be transformed from the coordinate space of the first template into the coordinate space of the second template by using a Thin Plate Spline (TPS) function or an Iterative Closest Point (ICP) function. The TPS function and the ICP function belong to conventional art, and thus description regarding the same is omitted herein. The feature stitching circuit 130 can take in consideration of position deviation of the features generated by the fingerprint deformation to reduce error accumulation and increase recognition correct rate.

In step S644, the feature stitching circuit 130 can stitch the first template into the second template. After stitching the first template into the second template, the feature stitching circuit 130 can delete the first template from the template set $\{T\}$. After step S644 is completed, the feature stitching circuit 130 can execute step S641 once again to determine whether the template set $\{T\}$ includes two stitch-able templates. When determining that the template set $\{T\}$ does not include the stitch-able templates in step S641, the feature stitching circuit 130 executes step S645.

In step S645, the feature stitching circuit 130 adds the new template provided by step S630 to the template set $\{T\}$ (since this new template cannot be stitched to any template in the template set {T}). In step S646, the feature stitching circuit 130 can check whether the quantity of feature points among all the templates in the template set {T} is sufficient. If determining that the quantity of feature points in the template set {T} is less than one specific threshold in step S646, the fingerprint enrollment apparatus 100 can go back to step S610 to prompt the user to move the finger 310 away from the fingerprint sensor 110 and then place the finger 310 on the fingerprint sensor 110 once again, such that the feature stitching circuit 130 can obtain a new template yet again. Said specific threshold may be determined according to design requirements. If determining that the quantity of feature points in the template set {T} is greater than said specific threshold in step S646, the feature stitching circuit 130 executes step S647 to add the template set {T} to the database 140. The so-called "fingerprint enrollment" is completed after step S647 is completed.

Figure 7:
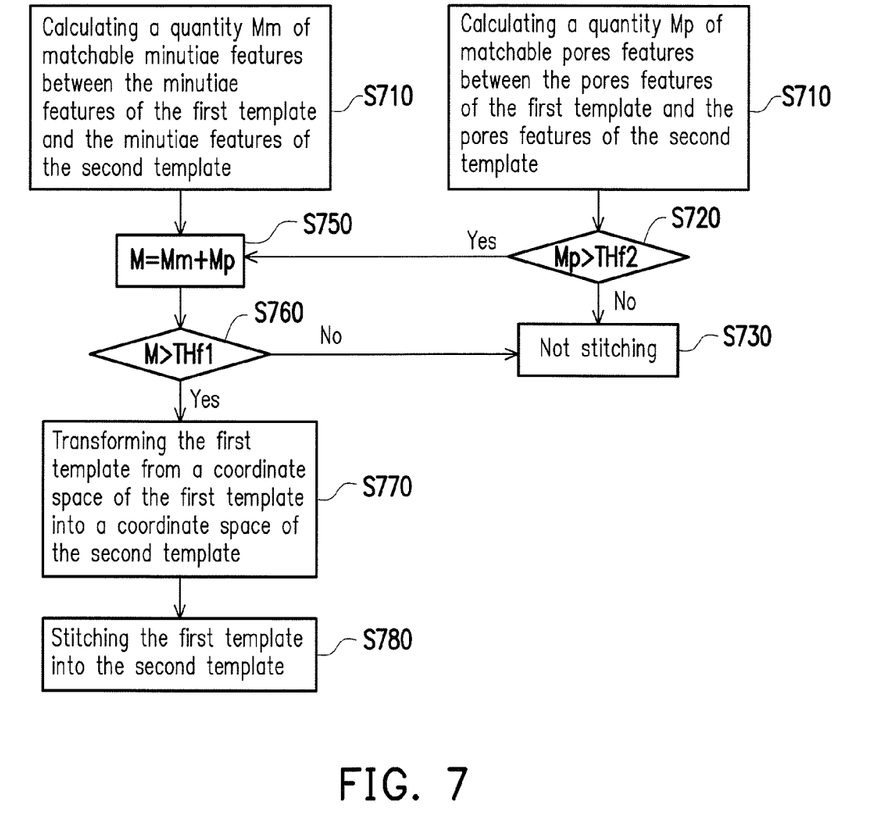
FIG. 7 is a flowchart illustrating a fingerprint enrollment method according to yet another embodiment of the invention.

FIG. 7 is a flowchart illustrating a fingerprint enrollment method according to yet another embodiment of the invention. Steps S710 to S780 shown in FIG. 7 may be considered as sub-steps of step S270 shown in FIG. 2. The embodiment shown in FIG. 7 may be deduced with reference to related description for step S270 shown in FIG. 2, and/or step S270 shown in FIG. 2 may be deduced with reference to the embodiment shown in FIG. 7.

Referring to FIG. 7, the feature stitching circuit 130 can compute a quantity of matchable pore features Mp between the pore features of the first template and the pore features of the second template in step S710. Based on design requirements, an elastic matching method, an alignment-based matching algorithm or other conventional algorithms may be adopted in step S710 to compute the quantity of matchable pore features Mp between the two templates. In step S720, whether the quantity of matchable pore features Mp is greater than a feature quantity threshold THf2 is determined. The feature quantity threshold THf2 may be determined according to design requirements. In the embodiment shown in FIG. 7, the feature quantity threshold THf2 may be set as 0. In some other embodiments, the feature quantity threshold THf2 may be set as other integer numbers. When determining that the quantity of matchable pore features Mp is less than the feature quantity threshold THf2 in step S720, the feature stitching circuit 130 performs step S730 (keeping both the first template and the second template in the template set {T} without stitching the first template and the second template). When determining that the quantity of matchable pore features Mp is greater than the feature quantity threshold THf2 in step S720, the feature stitching circuit 130 performs step S750.

The feature stitching circuit 130 can compute a quantity of matchable minutiae features Mm between the minutiae feature of the first template and the minutiae feature of the second template in step S740. Based on design requirements, an elastic matching method, an alignment-based matching algorithm or other conventional algorithms may be adopted in step S740 to compute the quantity of matchable minutiae features Mm between the two templates. The feature stitching circuit 130 can calculate a sum M of the quantity of matchable minutiae features Mm and the quantity of matchable pore features Mp in step S750. In step S760, whether the sum M is greater than a feature quantity threshold THf1 is determined. The feature quantity threshold THf1 may be determined according to design requirements. When determining that the sum M of the quantity of matchable minutiae features Mm and the quantity of matchable pore features Mp is less than the feature quantity threshold THf1 in step S760, the feature stitching circuit 130 performs step S730 (keeping both the first template and the second template in the template set {T} without stitching the first template and the second template).

When determining that the sum M of the quantity of matchable minutiae features Mm and the quantity of matchable pore features Mp is greater than the feature quantity threshold THf1 in step S760, the feature stitching circuit 130 performs step S770. In step S770, the first template is transformed from a coordinate space of the first template into a coordinate space of the second template. A method (algorithm) for transforming the coordinate space adopted in step S770 is not particularly limited by the present embodiment. For instance, in some embodiments, a "rigid body deformation of the fingerprint" algorithm may be adopted in step S770 (e.g., a coordinate space transformation is performed by a least square method between feature points). In some other embodiments, an "elastic deformation of the fingerprint" algorithm may be adopted in step S770. The elastic deformation of the fingerprint may be described and calculated by using a non-rigid body coordinate transformation. For example, in step S770, the first template may be transformed from the coordinate space of the first template into the coordinate space of the second template by using a Thin Plate Spline (TPS) function or an Iterative Closest Point (ICP) function. The TPS function and the ICP function belong to conventional art, and thus description regarding the same is omitted herein. The feature stitching circuit 130 can take in consideration of position deviation of the features generated by the fingerprint deformation to reduce error accumulation and increase recognition correct rate. In step S780, the feature stitching circuit 130 can stitch the first template into the second template. After stitching the first template into the second template, the feature stitching circuit 130 can delete the first template from the template set {T}.

It should be noted that, under different application scenarios, related functions of the feature extracting circuit 120, the feature stitching circuit 130 and/or the database 140 can be implemented in form of software, firmware or hardware by utilizing common programming languages (e.g., C or C++), hardware description languages (e.g., Verilog HDL or VHDL) or other suitable programming languages. The software (or the firmware) capable of executing the related functions can be arranged into any known computer-accessible media such as magnetic tapes, semiconductor memories, magnetic disks or compact disks (e.g., CD-ROM or DVD-ROM); or the software (or the firmware) may be transmitted via the Internet, a wired communication, a wireless communication or other communication mediums. Said software (or the firmware) can be stored in the computer-accessible media, so that a computer processor can access/execute programming codes of the software (or the firmware). In addition, the apparatus and the method of the invention can also be implemented by a combination of software and hardware.

In summary, the fingerprint enrollment method and the fingerprint enrollment apparatus 100 as described in the embodiments of the invention are capable of capturing multiple fingerprint images for the fingerprint enrollment from the same finger by the fingerprint sensor 110. During the enrollment, the feature stitching circuit 130 of the fingerprint enrollment apparatus 100 can dynamically use level 2 features and/or level 3 features of the fingerprint to automatically perform the stitching, mosaicking or synthesis of multiple templates corresponding to multiple fingerprint images, so as to enlarge the area of the template to thereby increase the quantity of feature points of the enrolled templates. A more preferable user experience may be provided since the area of the template is enlarged by stitching multiple groups of feature areas (unit templates) to increase degrees of freedom for pressing with the finger during the verification. Furthermore, the fingerprint enrollment apparatus 100 can enroll data of multiple templates at the same time. Therefore, the fingerprint enrollment method and the fingerprint enrollment apparatus 100 as described in various embodiments of the invention can adopt use of the small area sensor. By stitching multiple groups of enrolled feature areas, better Equal Error Rate (EER), False Match Rate (FMR) and False Non-Match Rate (FNMR) may be provided during the verification.

Equal error rate (EER) is an index mark mainly used for evaluating overall performance of the fingerprint algorithm. False match rate (FMR) is also one of the most important index mark for evaluating the fingerprint recognition algorithm. FMR may be commonly comprehended as a probability of "regarding the unmatchable fingerprint as the matching fingerprint". False non-match rate (FNMR) may be commonly comprehended as a probability of "regarding the matchable fingerprint as the mismatching fingerprint". In general, both FMR and FNMR are preferred to be as small as possible. FMR is decreased with the increasing similarity threshold whereas FNMR is increased with the increasing similarity threshold. Therefore, there is definitely an intersection point between FMR and FNMR. Such intersection point is a point having an equivalent value of FMR and FNMR, and corresponds to one specific similarity threshold. In usual practice, the value of such point (i.e., EER value) is used to measure overall performance of the algorithm.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fingerprint enrollment method adapted for a fingerprint enrollment apparatus comprising a processing unit, the fingerprint enrollment method comprises:
    capturing a first fingerprint image and a second fingerprint image by a fingerprint sensor;
    extracting, by the processing unit, a minutiae feature and a pore feature of the first fingerprint image to obtain a first template;
    extracting, by the processing unit, a minutiae feature and a pore feature of the second fingerprint image to obtain a second template;
    calculating, by the processing unit, a minutiae matching score between the minutiae feature of the first template and the minutiae feature of the second template;
    stitching, by the processing unit, the first template and the second template by utilizing a matching relation between the minutiae feature of the first template and the minutiae feature of the second template when the minutiae matching score is greater than a first threshold; and
    stitching, by the processing unit, the first template and the second template by utilizing a matching relation between the pore features of the first template and the pore features of the second template and utilizing matching relation between the minutiae feature of the first template and the minutiae feature of the second template when the minutiae matching score is between the first threshold and a second threshold, wherein the second threshold is less than the first threshold.

2. The fingerprint enrollment method of claim 1, wherein the step of stitching the first template and the second template by utilizing the matching relation between the minutiae feature of the first template and the minutiae feature of the second template comprises:
    selecting, by the processing unit, at least one matching minutiae feature from the minutiae features of the first template and selecting at least one matching minutiae feature from the minutiae features of the second template according to the matching relation between the minutiae features of the first template and the minutiae features of the second template;
    stitching, by the processing unit, the first template into the second template by transforming the first template from a coordinate space of the first template into a coordinate space of the second template according to the matching minutiae features of the first template and the matching minutiae features of the second template; and
    deleting, by the processing unit, the first template after stitching the first template into the second template.

3. The fingerprint enrollment method of claim 1, wherein the step of stitching the first template and the second template by utilizing the matching relation between the pore features of the first template and the pore features of the second template and utilizing the matching relation between the minutiae feature of the first template and the minutiae feature of the second template comprises:
    computing, by the processing unit, quantity of matchable minutiae features between the minutiae features of the first template and the minutiae features of the second template;
    computing, by the processing unit, quantity of matchable pore features between the pore features of the first template and the pore features of the second template;
    stitching, by the processing unit, the first template into the second template by transforming the first template from a coordinate space of the first template into a coordinate space of the second template when a sum of the quantity of matchable minutiae features and the quantity of matchable pore features is greater than a first feature quantity threshold; and
    deleting, by the processing unit, the first template after stitching the first template into the second template.

4. The fingerprint enrollment method of claim 3, further comprising:
    keeping, by the processing unit, both the first template and the second template without stitching the first template and the second template when the sum of the quantity of matchable minutiae features and the quantity of matchable pore features is less than the first feature quantity threshold.

5. The fingerprint enrollment method of claim 3, further comprising:
    keeping, by the processing unit, both the first template and the second template without stitching the first template and the second template when the quantity of matchable pore features is less than a second feature quantity threshold.

6. The fingerprint enrollment method of claim 3, wherein the step of transforming the first template from the coordinate space of the first template into the coordinate space of the second template comprises:
    transforming, by the processing unit, the first template from the coordinate space of the first template into the coordinate space of the second template by using a Thin Plate Spline function or an Iterative Closest Point function.

7. The fingerprint enrollment method of claim 1, further comprising:
stitching, by the processing unit, the first template and the second template by utilizing the matching relation between the pore features of the first template and the pore features of the second template when the minutiae matching score is less than the second threshold.

8. The fingerprint enrollment method of claim 7, wherein the step of stitching the first template and the second template by utilizing the matching relation between the pore features of the first template and the pore features of the second template comprises:
selecting, by the processing unit, at least one matching pore feature from the pore features of the first template and selecting at least one matching pore feature from the pore features of the second template according to the matching relation between the pore features of the first template and the pore features of the second template;
stitching, by the processing unit, the first template into the second template by transforming the first template from a coordinate space of the first template into a coordinate space of the second template according to the matching pore features of the first template and the matching pore features of the second template; and
deleting, by the processing unit, the first template after stitching the first template into the second template.

9. A fingerprint enrollment apparatus, comprising:
a fingerprint sensor, configured to capture a first fingerprint image and a second fingerprint image;
a feature extracting circuit, coupled to the fingerprint sensor to receive the first fingerprint image and the second fingerprint image, and configured to extract a minutiae feature and a pore feature of the first fingerprint image to obtain a first template and extract a minutiae feature and a pore feature of the second fingerprint image to obtain a second template; and
a feature stitching circuit, coupled to the feature extracting circuit to receive the first template and the second template, and configured to calculate a minutiae matching score between the minutiae features of the first template and the minutiae features of the second template, wherein the feature stitching circuit stitches the first template and the second template by utilizing a matching relation between the minutiae features of the first template and the minutiae features of the second template when the minutiae matching score is greater than a first threshold, and the feature stitching circuit stitches the first template and the second template by utilizing a matching relation between the pore features of the first template and the pore features of the second template and utilizing the matching relation between the minutiae features of the first template and the minutiae features of the second template when the minutiae matching score is between the first threshold and a second threshold, wherein the second threshold is less than the first threshold.

10. The fingerprint enrollment apparatus of claim 9, wherein the feature stitching circuit selects at least one matching minutiae feature from the minutiae features of the first template and selects at least one matching minutiae feature from the minutiae features of the second template according to the matching relation between the minutiae features of the first template and the minutiae features of the second template; the feature stitching circuit stitches the first template into the second template by transforming the first template from a coordinate space of the first template into a coordinate space of the second template according to the matching minutiae features of the first template and the matching minutiae features of the second template; and the feature stitching circuit deletes the first template after stitching the first template into the second template.

11. The fingerprint enrollment apparatus of claim 9, wherein the feature stitching circuit computes quantity of matchable minutiae features between the minutiae features of the first template and the minutiae features of the second template; the feature stitching circuit computes quantity of matchable pore features between the pore features of the first template and the pore features of the second template; the feature stitching circuit stitches the first template into the second template by transforming the first template from a coordinate space of the first template into a coordinate space of the second template when a sum of the quantity of matchable minutiae features and the quantity of matchable pore features is greater than a first feature quantity threshold; and the feature stitching circuit deletes the first template after stitching the first template into the second template.

12. The fingerprint enrollment apparatus of claim 11, wherein the feature stitching circuit keeps both the first template and the second template without stitching the first template and the second template when the sum of the quantity of matchable minutiae features and the quantity of matchable pore features is less than the first feature quantity threshold.

13. The fingerprint enrollment apparatus of claim 11, wherein the feature stitching circuit keeps both the first template and the second template without stitching the first template and the second template when the quantity of matchable pore features is less than a second feature quantity threshold.

14. The fingerprint enrollment apparatus of claim 11, wherein the feature stitching circuit transforms the first template from the coordinate space of the first template into the coordinate space of the second template by using a Thin Plate Spline function or an Iterative Closest Point function.

15. The fingerprint enrollment apparatus of claim 9, wherein the feature stitching circuit stitches the first template and the second template by utilizing the matching relation between the pore features of the first template and the pore features of the second template when the minutiae matching score is less than the second threshold.

16. The fingerprint enrollment apparatus of claim 15, wherein the feature stitching circuit selects at least one matching pore feature from the pore features of the first template and selects at least one matching pore feature from the pore features of the second template according to the matching relation between the pore features of the first template and the pore features of the second template; the feature stitching circuit stitches the first template into the second template by transforming the first template from a coordinate space of the first template into a coordinate space of the second template according to the matching pore features of the first template and the matching pore features of the second template; and the feature stitching circuit deletes the first template after stitching the first template into the second template.

17. A program code stored on a non-transitory computer readable medium of a fingerprint enrollment apparatus, comprising:

a first code segment, configured to extract a minutiae feature and a pore feature of a first fingerprint image captured by a fingerprint sensor to obtain a first template;

a second code segment, configured to extract a minutiae feature and a pore feature of a second fingerprint image captured by the fingerprint sensor to obtain a second template;

a third code segment, configured to calculate a minutiae matching score between the minutiae feature of the first template and the minutiae feature of the second template; and a fourth code segment, configured to stitch the first template and the second template by utilizing a matching relation between the minutiae feature of the first template and the minutiae feature of the second template when the minutiae matching score is greater than a first threshold, wherein the fourth code segment stitches the first template and the second template by utilizing a matching relation between the pore features of the first template and the pore features of the second template and utilizing the matching relation between the minutiae feature of the first template and the minutiae feature of the second template when the minutiae matching score is between the first threshold and a second threshold, and wherein the second threshold is less than the first threshold.

18. The program code stored on a non-transitory computer readable medium of the fingerprint enrollment apparatus of claim 17, wherein the third code segment selects at least one matching minutiae feature from the minutiae features of the first template and selects at least one matching minutiae feature from the minutiae features of the second template according to the matching relation between the minutiae features of the first template and the minutiae features of the second template, and the fourth code segment stitches the first template into the second template by transforming the first template from a coordinate space of the first template into a coordinate space of the second template according to the matching minutiae features of the first template and the matching minutiae features of the second template and deletes the first template after stitching the first template into the second template.

19. The program code stored on a non-transitory computer readable medium of the fingerprint enrollment apparatus of claim 17, wherein the third code segment computes quantity of matchable minutiae features between the minutiae features of the first template and the minutiae features of the second template and computes quantity of matchable pore features between the pore features of the first template and the pore features of the second template, and the fourth code segment stitches the first template into the second template by transforming the first template from a coordinate space of the first template into a coordinate space of the second template when a sum of the quantity of matchable minutiae features and the quantity of matchable pore features is greater than a first feature quantity threshold and deletes the first template after stitching the first template into the second template.

20. The program code stored on a non-transitory computer readable medium of the fingerprint enrollment apparatus of claim 19, wherein the fourth code segment keeps both the first template and the second template without stitching the first template and the second template when the sum of the quantity of matchable minutiae features and the quantity of matchable pore features is less than the first feature quantity threshold.

21. The program code stored on a non-transitory computer readable medium of the fingerprint enrollment apparatus of claim 19, wherein the fourth code segment keeps both the first template and the second template without stitching the first template and the second template when the quantity of matchable pore features is less than a second feature quantity threshold.

22. The program code stored on a non-transitory computer readable medium of the fingerprint enrollment apparatus of claim 19, wherein the fourth code segment transforms the first template from the coordinate space of the first template into the coordinate space of the second template by using a Thin Plate Spline function or an Iterative Closest Point function.

23. The program code stored on a non-transitory computer readable medium of the fingerprint enrollment apparatus of claim 17, wherein the fourth code segment stitches the first template and the second template by utilizing the matching relation between the pore features of the first template and the pore features of the second template when the minutiae matching score is less than the second threshold.

24. The program code stored on a non-transitory computer readable medium of the fingerprint enrollment apparatus of claim 23, wherein the third code segment selects at least one matching pore feature from the pore features of the first template and selects at least one matching pore feature from the pore features of the second template according to the matching relation between the pore features of the first template and the pore features of the second template, and the fourth code segment stitches the first template into the second template by transforming the first template from a coordinate space of the first template into a coordinate space of the second template according to the matching pore features of the first template and the matching pore features of the second template and deletes the first template after stitching the first template into the second template.

* * * * *